Jan. 26, 1960
A. W. OLSON ET AL
2,922,391
METALLIZING APPARATUS
Filed April 25, 1956
9 Sheets-Sheet 1
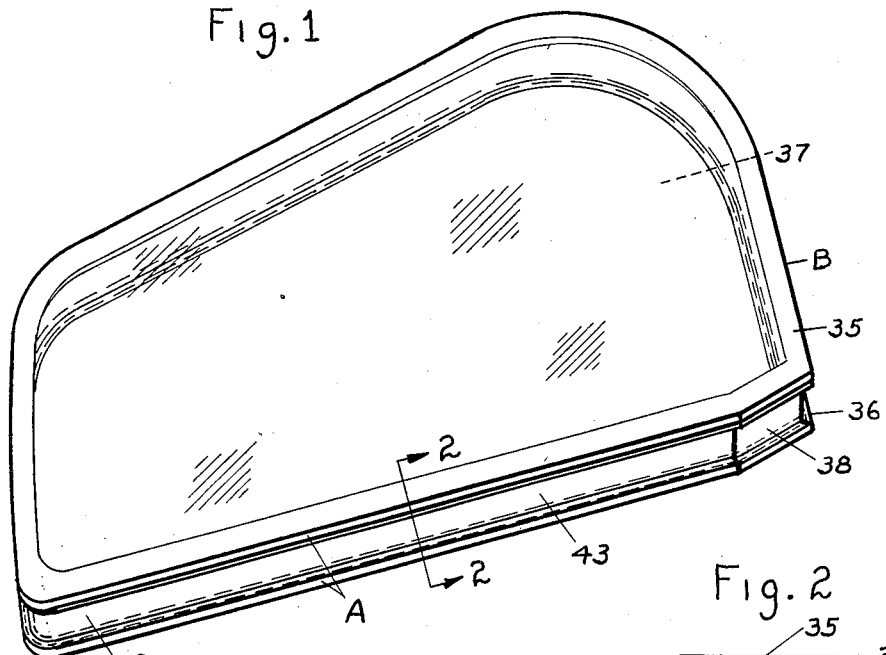
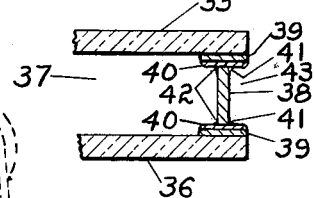
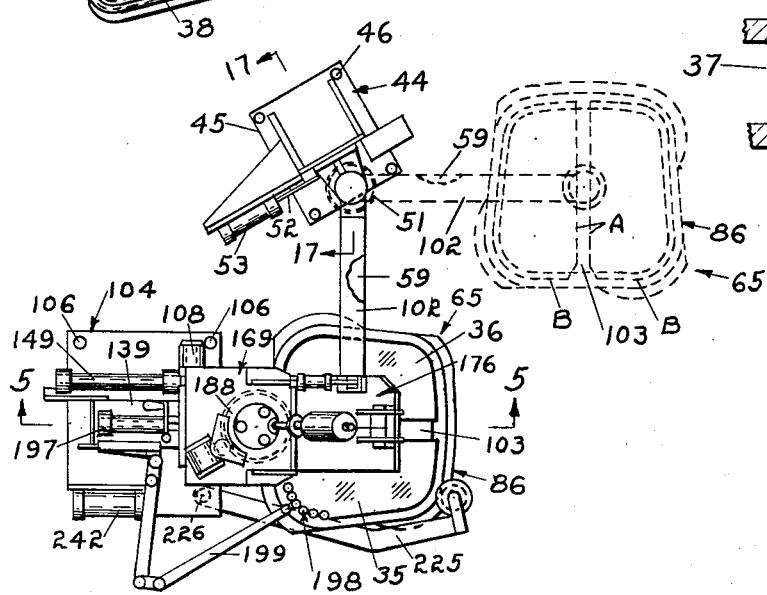
INVENTORS
Albert W. Olson and
BY  John N. Keller
Nobbe & Swope
ATTORNEYS

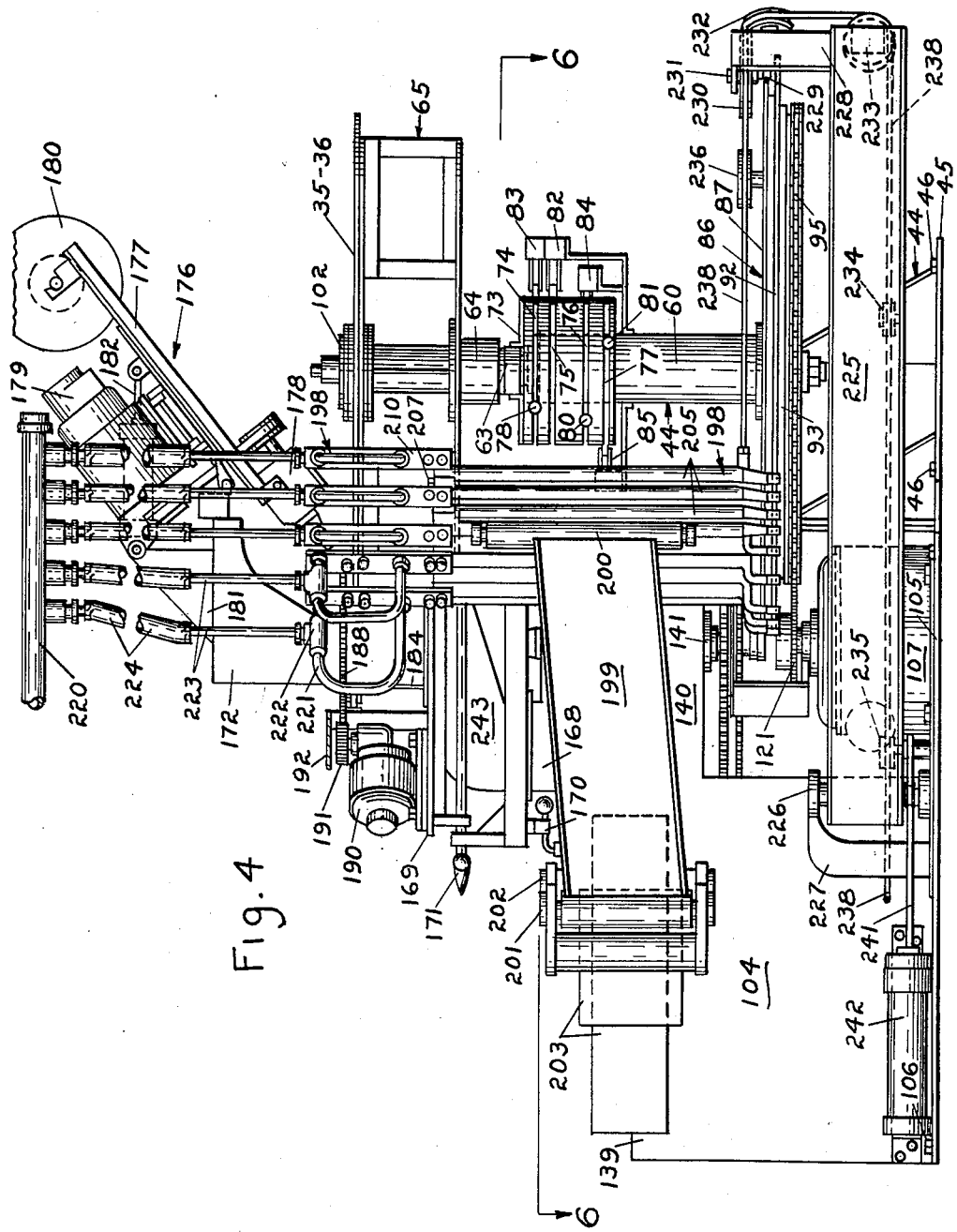

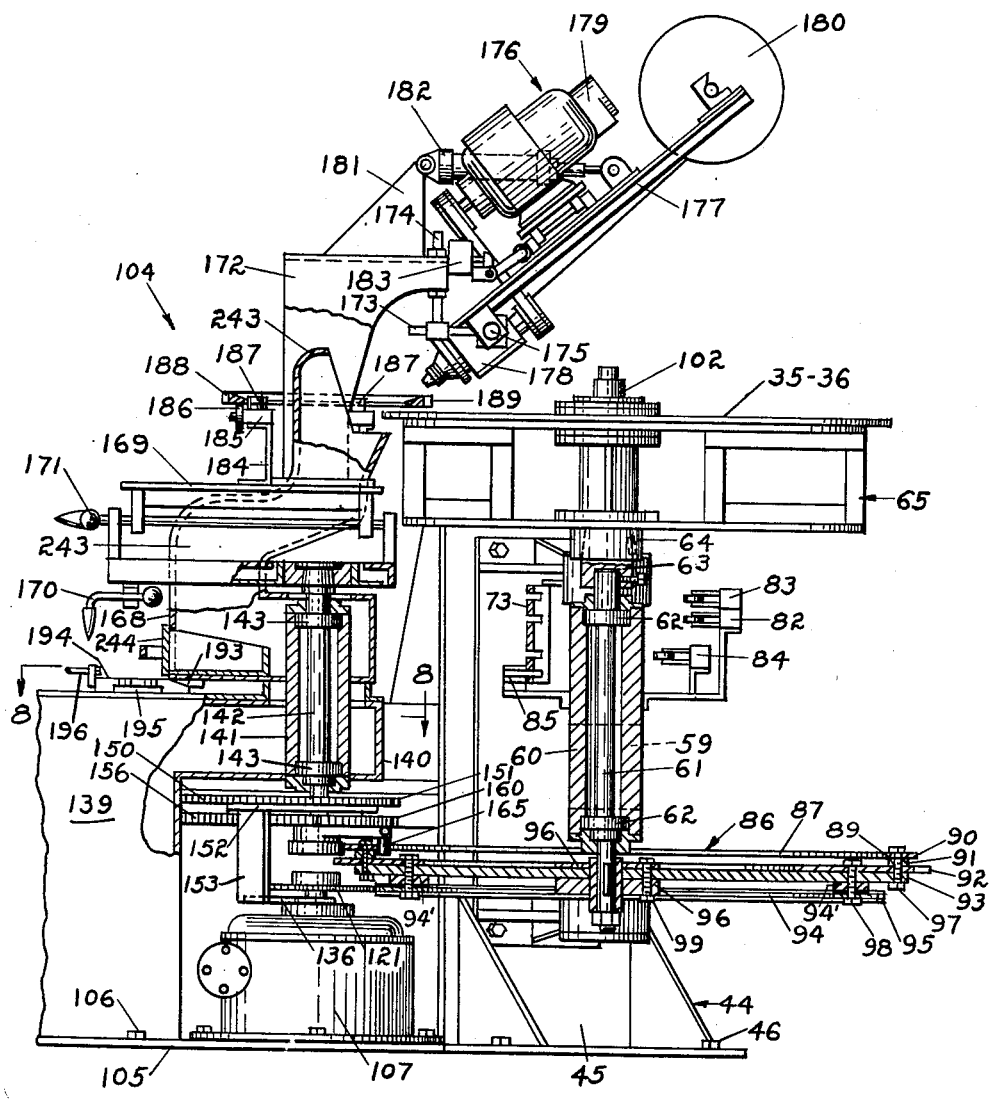

Jan. 26, 1960
A. W. OLSON ET AL
2,922,391
METALLIZING APPARATUS
Filed April 25, 1956
9 Sheets-Sheet 4
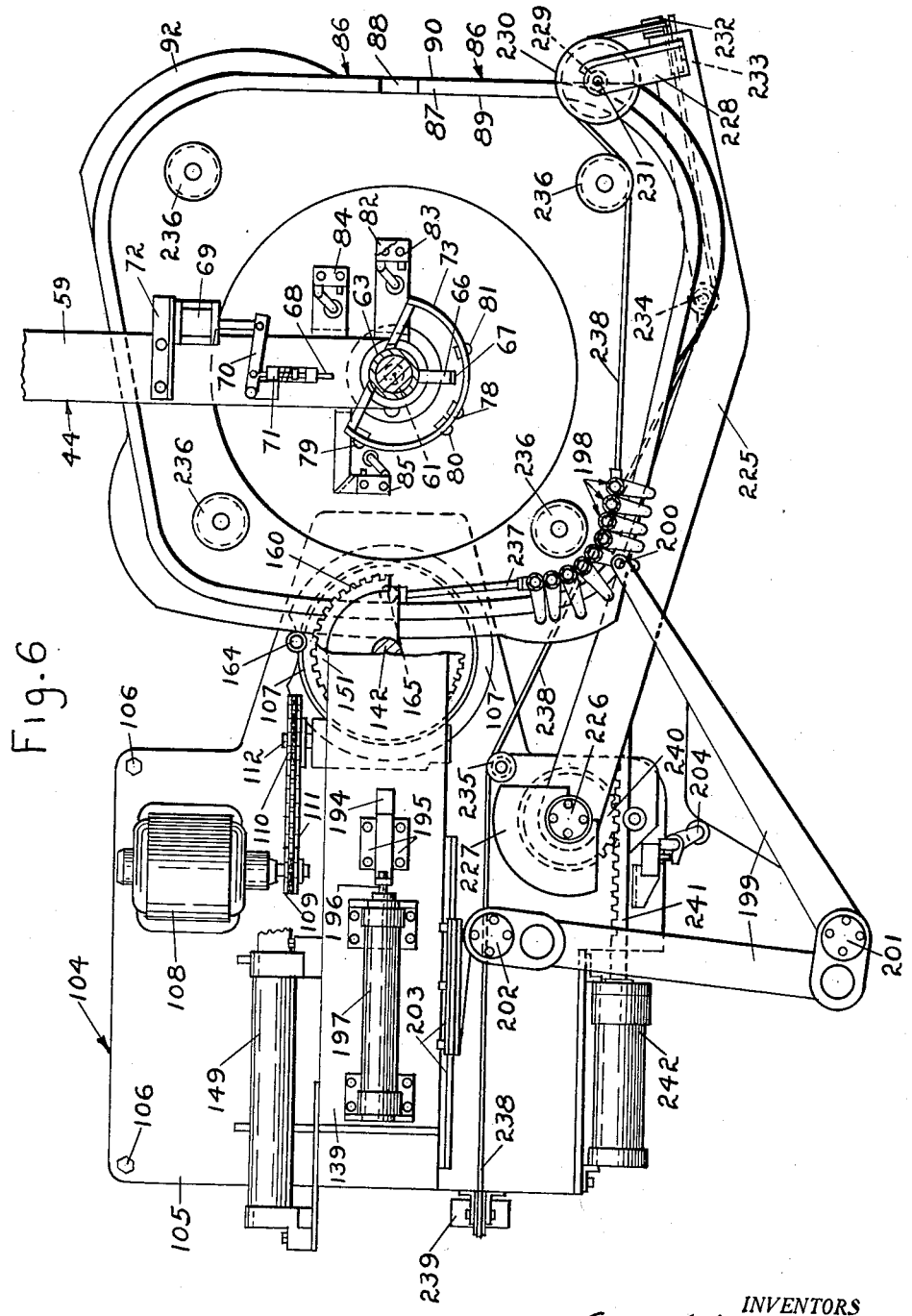
INVENTORS
Albert W. Olson and
BY John N. Keller
Nobbe & Swope
ATTORNEYS Jan. 26, 1960
A. W. OLSON ET AL
2,922,391
METALLIZING APPARATUS
Filed April 25, 1956
9 Sheets-Sheet 5
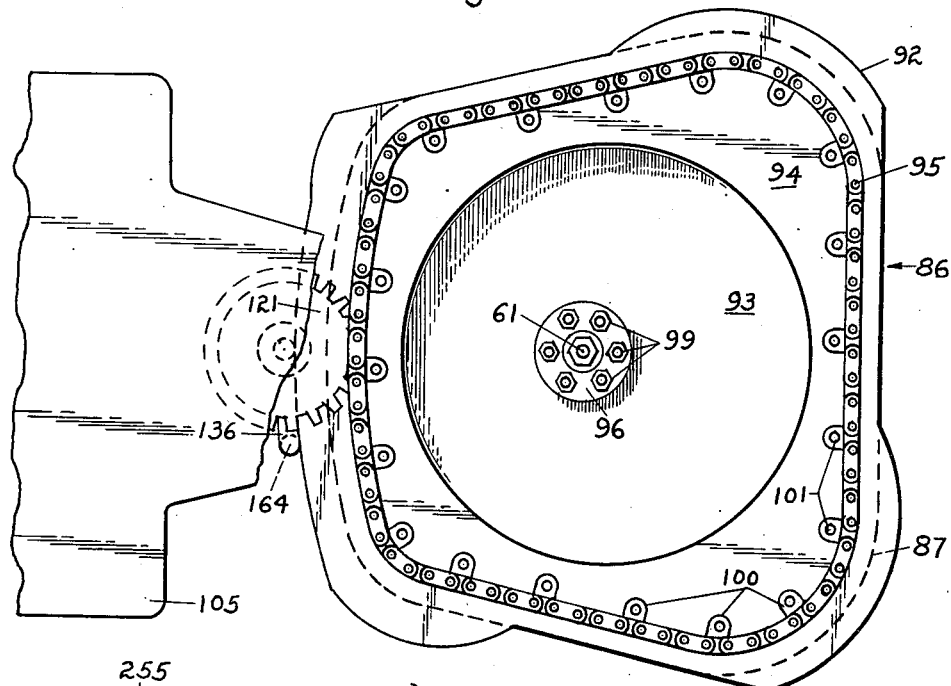
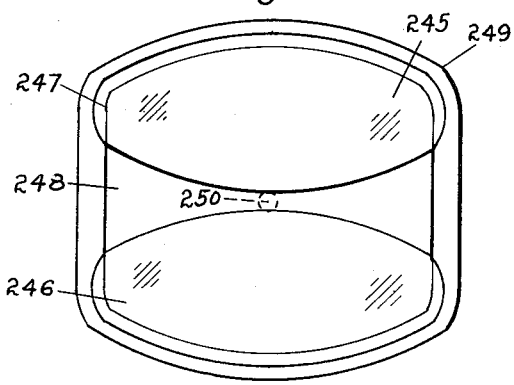
INVENTORS
Albert W. Olson and
BY John N. Keller
Nobbe & Swope
ATTORNEYS

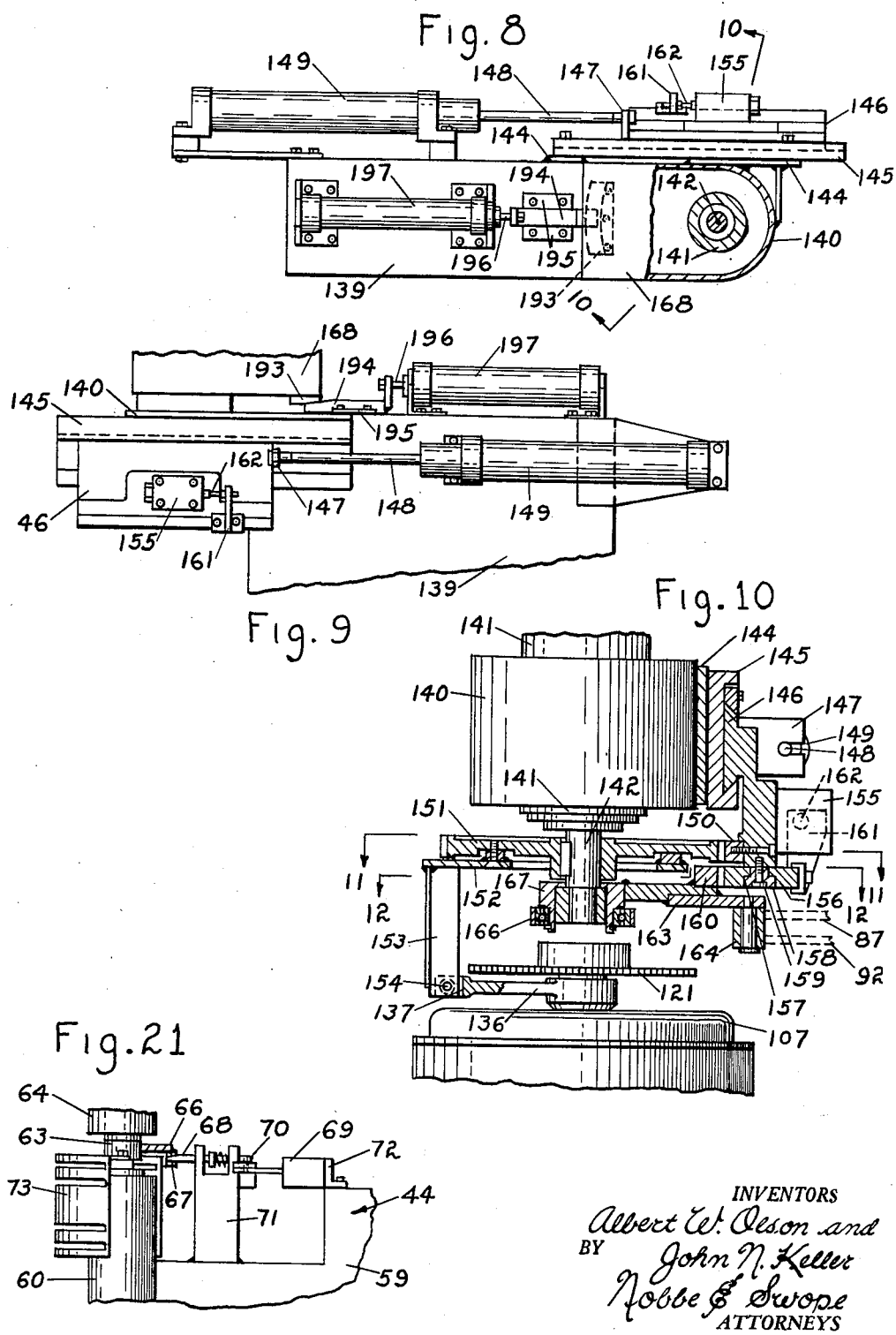

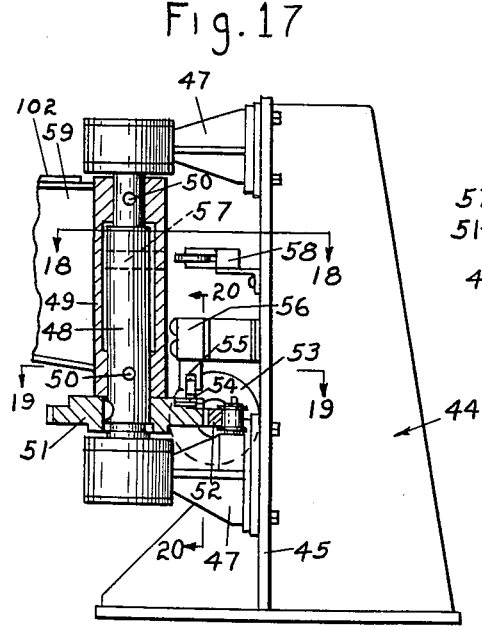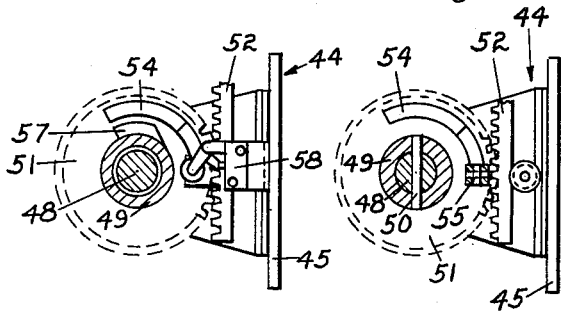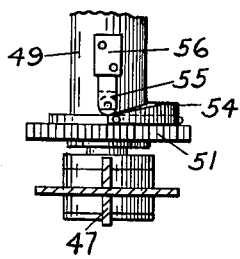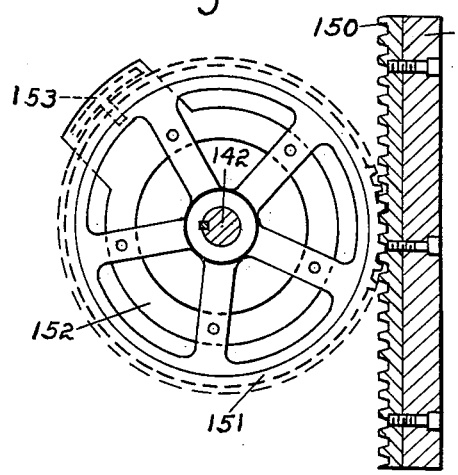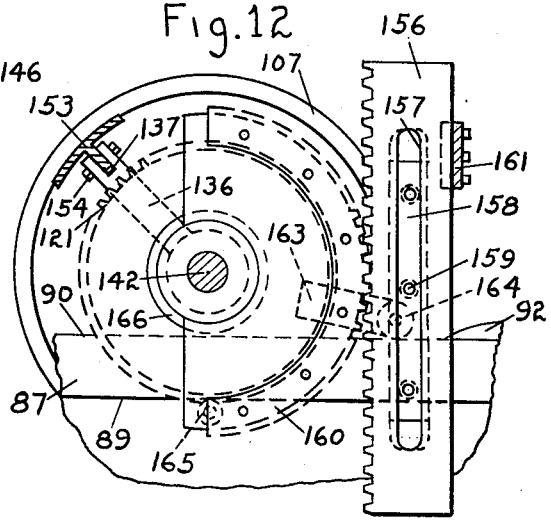

Jan. 26, 1960

A. W. OLSON ET AL 2,922,391

METALLIZING APPARATUS

Filed April 25, 1956

INVENTORS
Albert W. Olson and
BY John N. Keller
Nobbe & Swope
ATTORNEYS

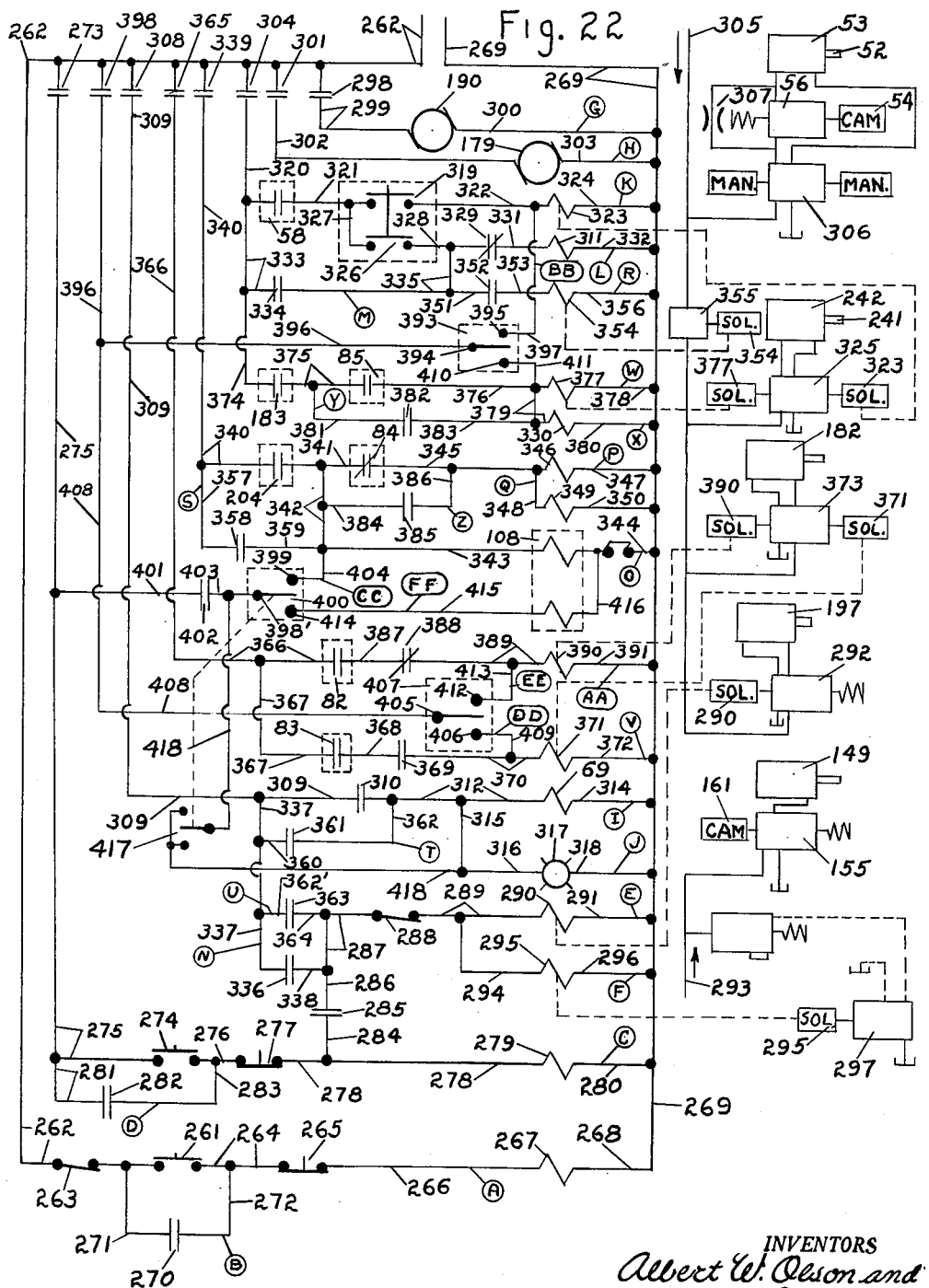

United States Patent Office 2,922,391
Patented Jan. 26, 1960

2,922,391

METALLIZING APPARATUS

Albert W. Olson and John N. Keller, Toledo, Ohio, assignors to Libbey-Owens-Ford Glass Company, Toledo, Ohio, a corporation of Ohio Application April 25, 1956, Serial No. 580,530

12 Claims. (Cl. 118—11)

This invention relates to method and apparatus for coating the marginal portions of glass sheets and, more specifically to apparatus for placing a metallic coating on surface portions of glass sheets.

The invention is particularly concerned with the production of multiple glass sheet glazing units comprising two or more sheets of glass spaced apart by metallic separator means bonded to the glass sheets around the marginal portions thereof through the intermediary of a metallic coating or coatings to form a hermetically sealed structure.

Heretofore, production of multiple sheet glazing units has been limited to substantially straight sided sheets as disclosed in Patent No. 2,334,624, issued to Charles D. Haven and John J. Hopfield on November 16, 1943. In some instances the corners have been cut off at an angle or slightly rounded and metal has been applied to these corners on straight line machines by making successive passes under the metallizing gun and slightly shifting the glass on the conveyor after each pass. However, this method is costly due to excessive handling and results in low production and waste of metal since the glass margin exposed to the metal on each pass is very small in comparison to the conveyor footage traveling past the metallizing gun.

It is therefore an object of this invention to provide an apparatus for placing a metallic coating on the marginal edge portions of glass sheets wherein the margin is other than a straight line.

It is another object of this invention to provide an apparatus for placing a metallic coating on the marginal edge portions of glass sheets having curved edges wherein the peripheral speed of the glass is held constant during the preheating and metallizing operations.

It is still another object of the invention to provide an apparatus wherein the preheating units may be moved from the vicinity of the glass during a selected portion of the cycle.

It is still another object of the invention to provide an apparatus wherein the metallizing spray may be moved to an ineffective position during a selected portion of the cycle.

It is yet another object of the invention to provide automatic, cyclical and safety controls for the apparatus.

Other objects and advantages of the invention will become more apparent during the course of the following description when taken in connection with the accompanying drawings.

Fig. 1 is an isometric drawing showing one form of the finished product;

Fig. 2 is a section taken on the line 2—2 of Fig. 1;

Fig. 3 is a plan view of the apparatus which applies molten metal to one surface of the glass adjacent the perimeter thereof;

Fig. 4 is a side elevation of the apparatus viewed from the bottom of Fig. 3, showing the general arrangement of the apparatus and the preheating burners in particular;

Fig. 5 is a vertical section of the apparatus taken substantially on the line 5—5 of Fig. 3;

Fig. 6 is a horizontal section of the apparatus taken substantially on the line 6—6 of Fig. 4;

Fig. 7 is a fragmentary view of the apparatus looking up from the bottom of Fig. 4, showing the drive for the work table;

Fig. 8 is a horizontal section taken on the line 8—8 of Fig. 5 showing the metallizing gun mount locking mechanism and the air valve and cylinder for controlling the movement of the gun mount;

Fig. 9 is an elevation of the mechanism shown in Fig. 8 as viewed from the top thereof;

Fig. 10 is a vertical elevation with parts in section of the mechanism shown in Fig. 8, taken substantially on the line 10—10 thereof;

Fig. 11 is a horizontal section taken on the line 11—11 of Fig. 10;

Fig. 12 is a horizontal section taken on the line 12—12 of Fig. 10;

Fig. 17 is a vertical section of the work table supporting column taken on the line 17—17 of Fig. 3 showing the safety switch and air valve;

Fig. 18 is a horizontal cross-section taken on the line 18—18 of Fig. 17 showing the safety switch and associated cam;

Fig. 19 is a horizontal cross-section taken on the line 19—19 of Fig. 17 showing the air valve and associated cam;

Fig. 20 is a vertical section taken on the line 20—20 of Fig. 17 also showing the air valve and cam;

Fig. 21 is a view taken from the right of Fig. 6 showing the work table and template aligning mechanism;

Fig. 22 is a schematic diagram of the electrical, pneumatic and hydraulic systems for the apparatus of the invention;

Fig. 23 is a plan view showing another form of glass with a contour comprised of combination external radii with which the invention may be utilized; and Fig. 24 is plan views showing how pairs of glass each having a contour comprised of a combination of external radii and an internal radius are processed by the apparatus of the invention.

Figure 14:
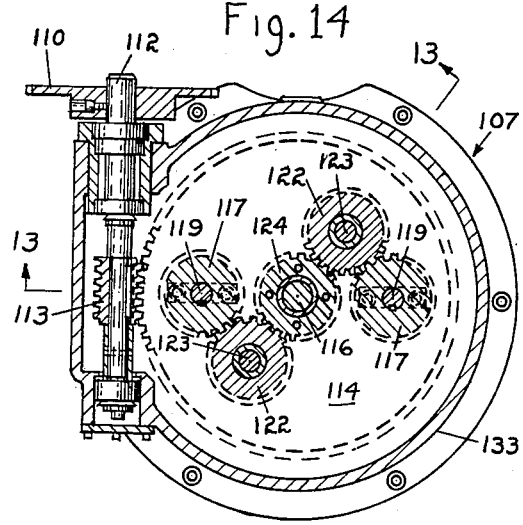
Fig. 14 is a horizontal, cross-sectional view of the differential taken on the line 14—14 of Fig. 13.

With reference now to the drawings, Figs. 1 and 2 disclose a glazing unit consisting of two sheets of glass 35 and 36 arranged in spaced, substantially parallel relation, to provide an insulating air space 37 therebetween. This air space is formed by the use of metal separator strip 38 joined to the glass sheets through the intermediary of metallic coatings 39 and 40 and the metal fillets 41 and 42 arranged at opposite sides of the separator strips and uniting the strips to the metallic coatings 40. The separator strips may be arranged inwardly of the outer edges of the glass sheets to form a channel 43 which may be filled with a suitable weatherproofing seal of an organic or inorganic material. In the event a seal is not required, the strip 38 may be placed flush with the peripheral edges of the glass.

The metallic coating 39 is preferably pure copper or a copper alloy, the separator strips 38 are preferably made of lead and the coating 40 and fillets 41 and 42 are of solder. The solder should have a low melting point to minimize the possibility of setting up undesirable stress in the glass.

For purposes of illustration, a two sheet glazing unit has been shown but this is in no way to be construed as limiting the number of sheets used or the number of spaces between the sheets. Neither are the shapes of the finished products to be limited to those shown in the drawings.

Prior to fabricating the unit it is imperative to thoroughly clean the glass to insure a perfect bond between the glass and the metal and also for appearance of the finished product, for when finished, the interior surfaces cannot be cleaned. It is thus necessary to fabricate the units in an atmosphere relatively free of dust and dirt.

Referring now to Figs. 3, 17, 18, 19 and 20, the numeral 44 generally indicates the glass support, which includes a pedestal or column 45 anchored to a base by bolts 46 or other suitable means. Brackets 47 extend laterally from the column and pivotally support a shaft 48 and a casing 49 which are fastened together by pins 50. A gear 51 is keyed to the shaft 48 and engaged by a rack 52 which is extended and retracted by the air cylinder 53. A cam 54 rises from the top face of gear 51 and is spaced radially from the center of the gear in a position to move the plunger 55 of an air valve 56 mounted on column 45, and connected by hose or other means to the cylinder 53. The valve 56 restricts the air entering the cylinder near the end of its stroke. A second cam 57 (17 and 18) is welded to the casing 49 above the air valve 56 and positioned to close a switch 58, mounted on the column 45.

An arm 59 (Figs. 3, 4, 5, 6, 7 and 17) extends laterally from the casing 49 and supports a column 60 at its opposite end and a shaft 61 is mounted in the column for rotation on bearings 62. The upper end of the shaft terminates in a male tapered fitting 63 which mates with a female fitting 64 on the bottom of a glass support table 65. The glass support table is similar in contour to that of the glass which is placed thereon, but is slightly smaller so that the glass will overhang the table on all sides. As may be seen in Fig. 3, the table 65 may be swung from the loading or dotted line position to a metallizing position shown in full lines by means of the air cylinder 53 acting through rack 52 and the gear 51 on shaft 48.

A bar 66 (Figs. 6 and 21) is welded to the fitting 63 to extend outwardly and has a downwardly directed extension 67 having a hole therein aligned with a detent 68 connected to a solenoid 69 through a spring retrieved linkage 70. The solenoid and plunger are fastened to the arm 59 by brackets 71 and 72 with the solenoid being electrically energized to withdraw the plunger from its locking position as will be described later. This assembly prevents rotation of the table 65 about shaft 61 while it is being moved between operative and inoperative positions.

A switch actuator segment 73 (Figs. 4, 5 and 6) is also fastened to the male fitting 63 and has radial slots 74, 75, 76 and 77. A movable cam 78, 79, 80 and 81 is movably mounted in each of the slots and are respectively aligned to actuate switches 83, 82, 84 and 85 respectively, all mounted on the arm 59.

A template assembly 86 (Figs. 4, 5, 6 and 7) is fastended to the bottom of shaft 61 and is substantially parallel to the table 65. The template assembly, progressing from top to bottom, is comprised of a template 87 which is continuous except for a depressed notched portion 88 (Fig. 6) the purpose of which is to be explained later, and has an inner face 89 and an outer face 90; a spacer 91, the edges of which are spaced away from the faces 89 and 90; a cam 92 which serves to maintain a substantially constant linear speed of the table 65 as will be explained later; a base plate 93 which is spaced away from the face of the cam 92; a support plate 94, with spacers 94' inserted between the plates 93 and 94, for a chain 95 all of which are similar in contour to the glass and the work table 65; and flanges 96; the respective members are all fastened together by screws and nuts 97, 98 and 99 while clips 100 and screws 101 secure the chain to the plate 94.

To hold a glass sheet in position hand operated clamp 102 (Figs. 3, 4, 5 and 17) is mounted on the arm 59 and engages the top surface of the glass 35—36 to prevent it from shifting during the cycle. In Fig. 3 a pair of identically shaped sheets of glass have been placed upon the table with a straight side A butting against a combination locator and separator 103 which is slightly thinner than the glass. In this instance the straight sides A and B (Fig. 3) of the sheets will have metal applied on straight line metallizing apparatus and only the curved edge portions of the sheets will be metallized by the apparatus of the present invention.

Figure 15:
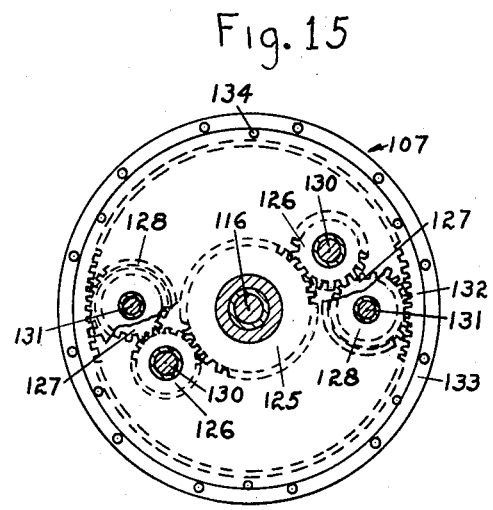
Fig. 15 is a horizontal cross-section of the differential taken on the line 15—15 of Fig. 13.
Figure 13:
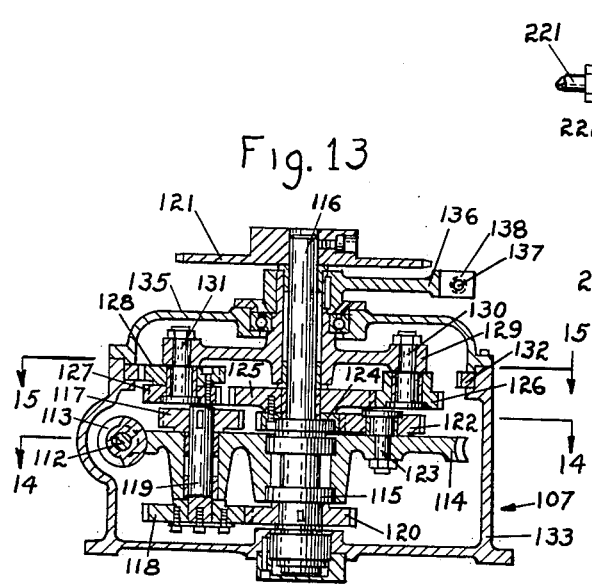
Fig. 13 is an elevation, in section, of the differential taken on the line 13—13 of Fig. 14.

The metallizing gun mount and table drive assembly (Figs. 3, 4, 5, 6, 13, 14 and 15) is generally indicated by the numeral 104. A plate 105 is anchored to a solid base by bolts 106 and has mounted thereon a differential speed reducer 107. An electric motor 108 is also mounted on the base 105 and supplies power to the differential 107 through sprockets 109 and 110 and chain 111. Sprocket 110 is fastened to the projecting end of a shaft 112 of the differential 107. Shaft 112 (Figs. 13, 14 and 15) carries a worm gear 113 meshing with a worm wheel 114 mounted on bearings 115 for rotation on a centrally located, vertical shaft 116. The worm wheel 114 carries two sets of planetary gears 117 and 118, both sets fastened to shafts 119. The planetary gears 118 are mounted on the lower side of the worm wheel 114 and engage and drive a gear 120, the shaft 116 and a sprocket 121 in a counterclockwise direction as viewed from the top (Figs. 4 and 5). The sprocket 121 meshes with chain 95 and rotates the work table 65 in a clockwise direction.

The planetary gears 117 are located on the top side of the worm wheel 114 and each is in mesh with an idler gear 122 carried by the worm wheel 114 on shouldered pins 123. The idler gear 122 engages a sun gear 124. A gear 125 is fastened to gear 124, above and concentrically therewith. This gear assembly has a bearing surface for rotation on shaft 116. Duplicate sets of gears 126, 127 and 128 are suspended from a carrier 129 by shoulder pins 130 and 131 respectively and have bearings for rotation on the pins. Gears 127 and 128 are fastened together. The gear train is from gear 125 through gears 126, 127 and 128 to an internal ring gear 132 which is held in the differential housing 133 by dowel pins 134 or other suitable means. The carrier 129 has a portion extending up through the housing cover 135 which is supported by bearings on the shaft 116 and in the cover 135.

One end of a lever 136 is keyed to the portion of the carrier 129 extending above the cover, but below the sprocket 121. The other end of the lever 136 is bifurcated as indicated at 137 and has a hole 138 running transversely of the bifurcation.

Referring particularly to Figs. 3, 4, 5 and 6, a cabinet 139 rises from the base 105 and has a portion 140 projecting over the differential 107 which supports a column 141 on the vertical center-line of the differential. A shaft 142 is pivotally supported by bearings 143 in the bore of the column 141.

Referring particularly to Figs. 5 and 8 through 12 inclusive, pads 144 are welded to the projection 140 on the side nearest the pedestal 45. A dove-tailed slide support 145 is bolted to the pads and supports a mating slide 146 having a perforated ear 147 projecting laterally therefrom to receive a plunger 148 of a double acting air cylinder 149. A rack 150 is bolted to the side of the support 146 to mesh with a gear 151 which is keyed to shaft 142 below the projection 140. An annular member 152 is bolted to the lower side of gear 151 and has a projection 153 extending outward and downward into the bifurcation 137 of lever 136 where it is secured by a screw and nut 154. An air valve 155 is fastened to the slide 146 on the side opposite the rack 150 and the valve 155 is pneumatically connected to the cylinder 149.

A second rack 156 having a longitudinally extending, inverted T-shaped slot 157 (Fig. 10) is fastened to the underside of slide 146 by an inverted T bar 158 and screws 159. The rack 156 is in mesh with a gear segment 160 which is keyed to the lower end of shaft 142. An upturned projection 161 is secured to the outside edge of rack 156 and engages the operating stem 162 of the valve 155. A bar 163 is welded to the lower side of the gear segment 160 in the position shown in Fig. 12 and carries a depending roller 164 which rides upon the outer face 90 of template 87 and cam 92. A second roller 165 (Figs. 5, 6 and 12) depends from the gear segment 160 positioned as shown in Fig. 12, and follows the inner face 89 of the template 87. A bearing 166 is mounted on the hub 167 of the gear segment 160 which serves as a bearing for the face 90 of template 87.

The roller 165 is positioned in the inside of the template 87 by passing it through the notch 88 in the template which aligns with the roller when the table 65 is swung by arm 59 into metallizing position. Of course, after table 65 begins to rotate about shaft 61 as will be described hereinbelow, the roller 165 will be locked on the inside of the template as shown in Fig. 6 and the table may not be pivoted away from metallizing position by arm 59 until the table makes a complete revolution and the notch 88 again aligns with the roller 165.

A platform 168 (Figs. 4 and 5) is secured to the upper end of shaft 142 and disposed to rotatably support a metallizing gun mount table 169 having cranks 170 and 171 for respectively adjusting the vertical and lateral positioning of the gun mount table 169 in relation to the glass support table 65. A bridge type structure 172 extends upward from the table, above and laterally in the direction of the glass table. Gas and air connections 173 and 174 depend from the bridge near the end of the extension and terminate in a pivotal connection 175 forming one point of support for the metallizing gun assembly, generally indicated by the numeral 176, and consisting of a base 177, the gun 178, a motor 179, belted to the gun and a reel 180 mounted on the base 177 to supply wire to the gun for reduction thereby to a hot metal spray. Gas and air connections to the gun 178 are made through flexible hose (not shown).

The rollers 164 and 165 respectively follow the contour of cam 92 and the inner face 89 of the template 87 to oscillate shaft 142, gun mount table 169 and the gun assembly 176 to direct the metal spray in a line lying within a vertically disposed plane passing through the longitudinal axis of gun 178 and the shaft 142, which line is substantially normal to that particular tangent point on the perimeter of the glass which is adjacent the point of spray impingement at any particular moment in the metallizing cycle.

An air cylinder 182 is secured to brackets 181 fastened to the bridge 172 and at its other end to the base 177 to pivot the gun assembly 176 about the pivot point 175 for a purpose and in a manner to be described hereinafter. In the effective position, shown particularly in Fig. 5, the angle inscribed by the intersection of a line running through the longitudinal axis of the gun 178 and the top surface of the glass 35—36 is substantially 39 degrees. A switch 183 is mounted on the structure 172 with its actuator positioned so that the switch is closed when the metallizing spray gun is in the up or effective position shown in Fig. 5.

Three brackets 184 (Fig. 5) are fastened to and rise from the top of table 169, each supporting a bearing block 185 for vertically positioned rollers 186 and horizontally positioned rollers 187 which support and confine the rotary movement of an annular spray shield 188. The spray shield 188 is substantially V-shaped in cross-section and has the thin edge thereof to the inside and has gear teeth 189 cut around the periphery. A right angled, geared head motor 190 (Fig. 4) is also mounted on the table 169 and gear 191, fastened to the motor shaft, meshes with the teeth 189 of the shield 188. A guard 192 is mounted on the table 169 and extends above the gear 191. The purpose of the shield 188 is to limit the application of metal to the margin of the glass and the mounting permits the shield to be lifted out for cleaning.

Referring particularly to Figs. 3, 5, 6, 8 and 9, the platform 168 has a block 193 fastened to the underside near the edge that is remote from the spray gun. The outer edge of the block is bevelled and formed in a radius originating at the vertical centerline of the shaft 142. A locking member 194 is mounted for longitudinal movement in guide blocks 195 fastened to the top of cabinet 139 on the longitudinal centerline and is also bevelled on the lead edge which is directed toward and under the block 193. The locking member 194 is fastened to the plunger 196 (Figs. 5, 8 and 9) of air cylinder 197. This mechanism serves to hold the gun mount platform stationary while swinging the glass table 65 out of and back into operating position by means of the arm 59.

To minimize the thermal shock when the molten metal is deposited on the margin of the glass and to insure a better bond between the glass and the metal, it is desirable to preheat the margin of the glass and for this purpose a battery of gas fueled preheaters generally indicated by the numeral 198, shown particularly in Figs. 3, 4, 6 and 16, supported in advance of the gun 178 on an arm 199 having pivots at 200, 201 and 202. The pivot 200 is fastened to the center burner and the pivot 202 is fastened to the side of the cabinet 139 by a locking dove-tail slide 203 which permits movement of the pivot along the side of the cabinet to position the burners with respect to the point of application of the metal. A switch 204 is mounted on cabinet 139 in position to be actuated by arm 199.

Each of the burners (Fig. 16) has a supporting member 205 which is offset outwardly at the bottom and carries a roller 206 which follows the outer face 90 of the template 87. The supporting members are pivotally joined at the top and bottom by screws 207 (Fig. 4). A plate 208 is welded or otherwise fastened to the top of the members 205 and has two tapped holes 209. A second plate 210 has a slot 211 at the lower end and a slot 212 at the upper end. The lower burner 213 is mounted on a pipe 214 fixed in and extending through the plate 210 and positioned so that the flame will impinge on the lower marginal surface of the glass.

Figure 16:
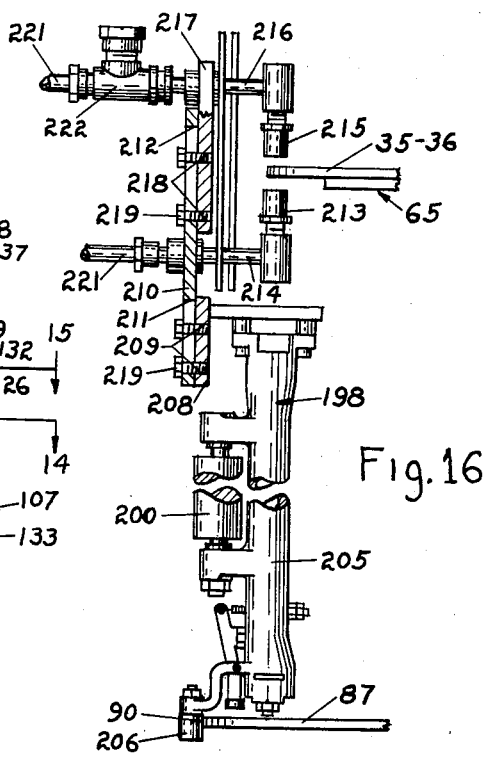
Fig. 16 is an elevation of a single preheater unit for the glass sheets showing its relationship with the template and the glass.

The top burner 215 is similarly mounted, except with the flame directed downwardly, on a pipe 216 and a plate 217 having tapped holes 218. Screws 219 pass through the slots 211, 212 in plate 210 and enter tapped holes 209 and 218 and provide vertical adjustment for the burners with respect to the surface of the glass. It will be noted that the glass overhangs the edge of the table 65, as shown in Figs. 5 and 16. Each of the upper and lower burners is connected to a gas supply line 220 through a U-tube 221, T 222, nipple 223 and hose 224, as is shown particularly in Fig. 4.

A curved, channel type burner control arm 225 (Figs. 3, 4 and 6) is pivoted at 226 on the base 105 and a bracket 227 and extends under and beyond the burner support arm 199 and also below the level of and adjacent the edge of the template-cam assembly 86 on the side remote from the column 45. An extension 228 is welded to the free end of the arm 225 at right angles thereto and carries a roller 229 which rides upon the outer face 90 of template 87 and a pulley 230 mounted for rotation on a shaft 231. A second pulley 232 is mounted on the end of extension 228, a third pulley 233 is mounted inside the channel adjacent the end of arm 225, a fourth pulley 234 is mounted on the lower leg of arm 225 parallel thereto and a fifth pulley 235 is mounted on the base 105. Four pulleys 236 are mounted on the top surfaces of the cam 92 at the same elevation as pulley 230 on the arm 225.

A flexible cable 237 is attached to the gear segment 160 at a point above the roller 165 and to the lower end of the first or lead burner, which is the one farthest to the left in Fig. 6. A second flexible cable 238 is attached to the lower end of the last burner which is farthest to the right in Fig. 6, and when the table 65 is in working position is threaded into the outside of the groove of the pulley 236 that is nearest pulley 230 on the end of arm 225, into the grooves of pulleys 230, 232, 233, 234 and 235 and terminates in a counterweight 239.

Arm 225 carrying the burners 198 is moved into the heating or full line position shown in Fig. 6 after table 65 has been moved to metallizing position by a gear 240 fastened to rotate the pivot 226 in conjunction with a rack 241 connected to the piston rod of an air cylinder 242 which exerts a force on arm 225 urging roller 229 at the far end of the arm into contact with the face 90 of template 87. The preheaters 198 are kept in position until the marginal edge portion of the glass first heated and coated again approaches the preheaters, at which time the preheaters are pivoted out of heating position by arm 225 and cylinder 242 as will be described hereinbelow so that heat will not be directed to the freshly coated areas.

In Fig. 5, a duct 243 is formed as a part of the platform 168 and is in line with the spray of the molten metal which overshoots the margin of the glass while the metallizing gun 178 is in effective position, or the entire metal spray from the gun when in its horizontal or in ineffective position. The duct 243 terminates above an open topped drawer 244 which may be removed for periodic cleaning.

While sheets of a particular configuration are shown in Figs. 1 and 3, it will be evident that sheets of other sizes and shapes having curved marginal edge portions may also be metallized by the apparatus of the invention by changing the contour of the template 86 and cam 92. Examples of sheets of different shapes that may be metallized by the apparatus are shown in Figs. 23 and 24.

In Fig. 23 a pair of glass sheets 245 and 246, which are symmetrical about their centerlines, are placed upon a work table 247 having a raised dividing and locating strip 248 fastened to the surface. The template is indicated by the numeral 249. In this instance, after the table makes one revolution about its center 250, sheets 245 and 246 are interchanged so that the uncoated edges are to the outside and then the table is recycled for one more revolution to completely coat the margins of both sheets.

In Fig. 24 the sheets are substantially kidney-shaped and require two work tables and template assemblies. For the first step the glass sheets 251 and 252 are placed on table 253 being positioned by the raised separator 254. The template is indicated by the numeral 255 and the center of the table and template by 256. After one revolution of the table 253, the glass is ready for the second step and is shifted to table 257 for one revolution. Associated with table 257 is separator 258, template 259, and center 260.

*Electrical, hydraulic and pneumatic systems*

Referring to Fig. 22, switches 263 and 288 are closed when coating the margin of glass having a perimeter comprised of a combination of radii and are opened when coating the margin of circular glass which does not require variation of the peripheral speed. Opening switches 263 and 288 disables circuits A, B, E and F, formed hereinafter.

For automatic operation, switches 273, 298, 301, 304, 308, 339, 365, at top of wiring diagram, are closed to initiate the cycling of the apparatus as described in the following paragraphs.

With the preheaters 198 lit, start switch 261 is closed momentarily to start the hydraulic pump (not shown) by establishing circuit A from main line 262 through switches 263 and 261, line 264, stop switch 265, line 266, relay coil 267 and line 268 to the other main 269. Relay coil 267 closes contacts 270 to establish a holding circuit B around the normally open start switch 261. This circuit holds the hydraulic pump motor energized until stop switch 265 is opened.

Closing of manually operated switch 273 and momentarily closing manually operated switch 274 establishes circuit C from main 262 through switch 273, line 275, switch 274, line 276, stop switch 277, line 278, relay coil 279 (closes contacts 282, 285 and 402), line 280 to main 269 to start an air compressor (not shown) and also establishes a holding circuit D through contacts 282 around the normally open starter switch 274.

A branch circuit E is also extended from line 278, through line 284, contacts 285 of relay 279 (closed in circuit C and held by circuit D), lines 286 and 287, switch 288, line 289, solenoid 290 and line 291 to main 269. Solenoid 290 opens a four way valve 292 to admit air under pressure from supply pipe 305 to cylinder 197 to withdraw the locking member 194 from engagement with the block 193 (Figs. 5, 8 and 9) to permit pivotal movement of the gun mount table 169. A second branch circuit F extends from line 289 through line 294, solenoid coil 295, line 296 to main 269. This circuit closes the hydraulic system unloading valve 297 to condition the system for pressurizing. Manual switch 298 is closed to establish circuit G from main 262 through switch 298, line 299, shield motor 190, line 300 to main 269 which rotates the spray shield 188. Manual switch 301 is closed to establish circuit H from main 262 through switch 301, line 302, metallizing gun motor 179, line 303 to main 269. The spray gun 176 is now in operation but is in a horizontal position with the molten metal spray directed into the duct 243 and waste drawer 244.

Opening of a manually operated four-way pneumatic valve 306 admits air under pressure from supply line 305 to enter cylinder 53 through valves 306 and 56, extending the rack 52 to revolve the table 65 in a clockwise direction about the axis (Fig. 3). As the chain 95 on the table 65 nears engagement with the sprocket 121, cam 54 (Figs. 17 through 20) closes valve 56 and the air is by-passed through an adjustable needle valve 307 into cylinder 53 to cushion the impact of chain 95 with sprocket 121. Cam 57 closes switch 58, near the end of the traverse of the table 65 to condition circuits K and L for subsequent energization.

Closing of manually operated switch 308 conditions circuit I for subsequent energization extending from main 262 through switch 308, line 309, normally open contacts 310 of relay 311 which will be closed upon completion of circuit L, line 312, solenoid 69, line 314 to main 269 which will withdraw the template detent 68 (Fig. 21) at that time and also conditions circuit J extending from line 312 through lines 315 and 316, pilot light 317, line 318 to main 269. Relay coil 311 will be energized in circuit L and held by circuit M, described hereinafter.

Closing of manually operated switch 304 and momentarily closing manually operated switch 319 energizes circuit K extending from main 262 through switch 304, line 320, switch 58 (closed previously when table 65 was rotated into operating positon), line 321, switch 319, line 322, solenoid 323, line 324 to main 269. Solenoid 323 opens valve 325 and air is admitted to cylinder 242 (Figs. 4 and 6) to extend the rack 241 and rotate gear 240 and arms 225 and 199 to position the preheaters 198 for heating the margin of the glass. Arm 199 closes switch 204 which is a part of circuits P and Q below (Fig. 6).

Closing of switch 319 also momentarily closes switch 326 to establish a control circuit L extending from line 321 through line 327, switch 326, line 328, normally closed contacts 329 of relay 330, line 331, relay coil 311 to close contacts 310, 334, 336 and 369 and open contact 388, line 332 to main 269 and establishes holding circuit M extending from line 320 through line 333, contacts 334 of relay 311 (closed in circuit L), lines 335, 328, normally closed contacts 329 of relay 330, line 331, relay coil 311, line 332 to main 269.

Since switch 308 is in closed position and relay coil 311 is held energized by circuits L and M, the recently closed contacts 336 of relay 311 establish circuit N extending from line 309 through line 337, contacts 336 of relay 311, and line 338 to a juncture with lines 287 and 286 where it splits into two branches, one to circuits E and F and the other to circuit C through contacts 285 of relay 279 which were closed in circuit C and are held closed by circuit D.

Closing of the manually operated switch 339, establishes circuit O from main 262 through switch 339, line 340, switch 204 (closed and held closed when the preheater arm 199 was rotated into effective position) lines 341, 342 and 343, drive motor 108, line 344 to main 269, which rotates the table 65 in a clockwise direction as viewed in Fig. 3.

As the table moves forward, cam 80 (Figs. 4, 5 and 6) moves off the normally closed switch 84 which closes and remains closed for one complete revolution of the table 65 and energizes circuit P from line 341 through switch 84, line 345, relay coil 346 (closes contacts 352, 358 and 361), line 347 to main 269; circuit Q from line 345 through line 348, coil 349 of a time delay relay (closes contacts 363) line 350 to main 269; circuit R from line 335 through line 351, contacts 352 of relay 346 (closed in circuit P), line 353, solenoid 354 which positions a pressure reducing valve 355 in line 305 ahead of control valves 292, 325 and 373, and continuing through line 356 to main 269; circuit S from line 340 through line 357, contacts 358 of relay 346 (closed in circuit P) and line 359 to a juncture with line 343 and circuits O, P and Q; circuit T extending from line 337 through line 360, contacts 361 of relay 346 (closed in circuit P) and line 362 to a juncture with line 312 and circuits I and J; circuit U from line 337 through line 362', contacts 363 of time delay relay 349 (closed in circuit Q), line 364 to join line 287 and circuits C, E and F.

Switch 365 is closed manually, the table 65 continues rotating to preheat the margin of the glass and as the initially preheated glass moves into alignment with the gun nozzle, cam 78, carried by the table, momentarily closes switch 83 to establish circuit V from main 262 through switch 365, lines 366 and 367, switch 83, line 368, contacts 369 of relay 311 (closed in circuit L), line 370, solenoid 371, line 372 to main 269. Solenoid 371 opens a pneumatic valve 373 to admit air to one end of cylinder 182 (Fig. 5) to retract the plunger and elevate the spray gun assembly 176 into operating position. Switch 183 is closed near the end of the movement of the gun assembly to condition circuits W and X to be described below.

The table 65 continues to rotate till the initially coated margin of the glass approaches the preheaters 198 at which time cam 81 (Figs. 4, 5 and 6) will momentarily close switch 85 to energize circuit W from line 333 through line 374, switch 183 (previously actuated by movement of the metallizing gun 176 into effective position), line 375, switch 85, line 376, solenoid 377, line 378 to main 269, and also establishes circuit X from line 376 through line 379, relay coil 330 (closes contacts 382 and 385 and opens contacts 329), line 380, to main 269, which de-energizes circuits L and M by opening contacts 329 which in turn de-energizes relay coil 311 and circuits N and V by opening contacts 310, 334, 336 and 369 and closes contacts 388 and energizes a holding circuit Y from line 375 through line 381, contacts 382 of relay 330 (closed in circuit X) and line 383 to a juncture with line 379 and also energizes circuit Z from line 342 through line 384, contacts 385 of relay 330 (closed in circuit X) and line 386 to join line 345. When circuit W was established, solenoid 377 shifted valve 325 to retract the plunger of cylinder 242 (Fig. 6) and move the preheaters into inoperative position, which in turn opens switch 204. However, circuits O, P and Q are held energized through contacts 358 and 385. At this point, the table has revolved over 360 degrees and switch 84 was momentarily opened and is now closed and maintains circuit O through circuit S.

The table 65 continues to rotate till the last of the margin of the glass to be coated has traversed the metallizing station, at which time cam 79 (Fig. 6) momentarily closes switch 82 to energize circuit AA from main 262 through switch 365, line 366, switch 82, line 387, normally closed contacts 388 of relay 311, line 389, solenoid 390, line 391 to main 269.

Solenoid 390 shifts valve 373 to extend the plunger of cylinder 182 which lowers the gun assembly 176 into the horizontal or ineffective position and switch 183 is opened to de-energize circuits W, X and Y which de-energizes the relay coil 330 (closes contacts 329 and opens 382 and 385) to de-energize circuits Y and Z.

The table 65 continues rotating a full 720 degrees at which time cam 80 opens switch 84 to de-energize circuits P and Q, which in turn, de-energize coils 346 and 349 and opens contacts 352, 358 and 361 to de-energize circuits R, S and T. The table is at rest with template notch 88 aligned with the follower 165.

The time delay relay coil 349 in circuit Q, is now de-energized, but contacts 363, in circuit U, are held closed for a preselected period of time to hold circuits E, C, D and F, controlling the pneumatic systems, energized to allow sufficient time for the table 65 to be moved to its original or inoperative position, shown in dotted lines in Fig. 3, by shifting valve 306 to reverse the flow of air into cylinder 53. Movement of table 65 in a counterclockwise direction to its inoperative position de-energizes switch 58 in circuits K and L and the apparatus is now fully conditioned for another loading and automatic cycle. The remaining active circuits may be de-energized by opening switches 265, 273 or 277, 398, 301, 298, 308, 365, 339 and 304.

For manual operation of the apparatus, switch 261 in line 262 is momentarily closed to establish circuits A and B and start the hydraulic pump. Switches 273, 274, are also closed to energize circuits C, D, E and F. Switches 298 and 301 are closed to energize circuits G and H and the shield drive motor 190 and spray gun motor 179. All are fully described under the automatic operation.

In addition to the above, switch 398 is manually closed and selector switch 393 is manually moved to close contacts 394 and 395 to energize circuit BB from main 262 through switch 398, line 396, contacts 394—395, line 397 to join line 322 of circuit K which energizes solenoid 323 to move the preheater 198 into operative position, as described in the automatic operation above.

Closing of contacts 398'—399 of selector switch 400 energizes circuit CC extending from line 275 through line 401, contacts 402 of relay 279, line 403, contacts 398'—399, line 404 connecting with line 343 to energize the motor circuit O, joining with line 342 of circuit Z when relay 330 is energized to close contacts 385, and from line 342 connecting with line 341 to energize circuits P and Q, as described in the automatic operation above. Switch 84 closes as the table starts to move.

Closing of contacts 405—406 of selector switch 407 establishes circuit DD from line 396 through line 408, contacts 405—406, line 409 to a juncture with line 370 of circuit V, which moves the spray gun assembly 176 into its effective position and closes switch 183, as described in the automatic operation above.

The table is permitted to rotate clockwise (Fig. 3) until the metallized margin approaches the preheaters 198, whereupon the operator reverses switch 393 so that contact 394 is connected with contact 410 thereby de-energizing circuit K and by way of line 411 connecting with lines 376 and 379 energizing circuits W and X. Circuit W moves the preheaters 198 into their ineffective position, as described in the automatic operation above.

The table 65 continues to rotate till all the margin to be coated has passed through the metallizing zone, whereupon the operator will reverse switch 407 to de-energize circuit DD and connect contacts 405—412 and establish circuit EE through line 413 to line 389 of circuit AA which will lower the spray gun assembly into its horizontal or ineffective position, as fully described in the automatic operation above.

When the table has completed one revolution, the slot 88 in template 87 is aligned with the follower 165, switch 400 is shifted to neutral or "off" position which de-energizes circuit CC to stop the motor 108 and further rotation of the table 65.

Circuit FF is provided for convenience, should the operator run the template slot 88 past the follower 165, so that the table rotation can be reversed. The circuit extends from contacts 398'—414 through line 415, motor 108, lines 416 and 344 to main 269. Switch 417 is mechanically connected with switch 400 and in manual operation feeds from line 403, through switch 417 and line 418 into circuits I and J.

The mechanism shown in detail in Figs. 8 through 12 inclusive is powered by a hydraulic cylinder 149 and stabilizes the rotative motion of the table 65 and glass under the metallizing gun to maintain a constant linear speed and to expose an equal margin of glass in the metallizing area during the entire cycle of the apparatus.

Referring particularly to Fig. 12 it will be noted that the template 87 has a three point bearing; the outer face 90 contacting bearing 166 and roller 164, while the inner face 89 bears on the roller 165. The cam 92 also bears on the roller 164.

As the cam 92 rises, as shown in Fig. 12, rollers 164 and 165 will be rotated counterclockwise. This motion will be transmitted through lever 163 and segment 160 to move rack 156 and cam 161 rearward or away from the cam 92 as viewed in Figs. 10 and 12, which will shift stem 162 of valve 155 to exert pressure within hydraulic cylinder 149 which will retract piston rod 148 and move rack 150 attached to slide 146 rearward, as viewed in Figs. 10 and 11, which will rotate gear 151, member 152, projection 153 and lever arm 136 counterclockwise which will reduce the speed of sprocket 121 in the following manner.

As the lever arm 136 is moved counterclockwise (Fig. 12), carrier 129 is rotated counterclockwise, gears 128 and 127 are rotated clockwise, gears 126 counterclockwise, gears 125 and 124 clockwise, gear 122 counterclockwise and gear 117 clockwise. Assuming that the gear 124 is stationary and with the worm wheel 114 rotating clockwise, then gear 122 will rotate clockwise, gears 117 and 118 counterclockwise and gear 120 clockwise to rotate sprocket 121.

As lever arm 136 is moved counterclockwise (Fig. 12) by virtue of roller 164 being rotated counterclockwise by a rise in cam 92, gear 124 will be rotated a number of teeth clockwise to reduce the effective number of teeth for gear 122 to engage as it makes one complete revolution about gear 124. In this manner, the rotative speed of gears 122, 117, 118 and 120 to sprocket 121 is reduced in direct proportion to the degree of movement of lever 136. Since sprocket 121 rotates table 65 about shaft 61 through chain 95, the table will thus be reduced in speed as will the glass sheets carried thereby.

However, when the lever arm 136 moves to the right the differential 107 will react to speed up the output of sprocket 121. The net effect is to maintain the substantially constant linear speed of the glass as it passes under the metallizing gun 176 to deposit an even coating of metal over the entire margin regardless of its curvature.

Since both rack 156, carrying cam 161 and rack 150 supported on slide 146, which also carries valve 155, move rearwardly in succession, the valve 155 and cam 161 are substantially restored to their original positions. In effect the cylinder provides a counterforce to prevent overtravel in either direction.

The gear 151 is keyed to shaft 142 and platform 168 upon which the gun assembly 176 is mounted is also secured to the shaft 142, which in turn is pivotally mounted in column 141 so that the gun 176 moves with gear 151 and follows the contour of the glass.

When cam 92 recedes, followers 164 and 165 and the platform 168 will rotate clockwise and the differential 107 will speed up, increasing the output to sprocket 121 and to table 65.

Reviewing now the entire operation of the invention, initially the preheaters 198 are started. These may be either gas or electric heaters and may be started by any appropriate means. The loading table 65 at this time is in the inoperative position shown by the dotted lines in Fig. 3. Glass sheets 35—36 are then placed on the table and secured thereto by the clamp 102 (Figs. 3 and 4).

After the sheets are placed in position on the table, manual switch 261 (Fig. 22) is actuated to start the hydraulic system. At the same time switch 274 is actuated to ready the pneumatic system which enables the table locking member 194 (Figs. 5, 6, 8 and 9) on the gun mount assembly 176 to be withdrawn by the cylinder 197 thus enabling the gun mount assembly to oscillate through transmission 107 and shaft 142 to change the position of the metallizing gun 178 with respect to changes in curvature of the marginal edge portions of the sheets being metallized. At the same time, switch 298 is also actuated to cause the metallizing shield 188 (Figs. 4 and 5) to be rotated by the shield motor 190. The metallizing spray gun is then started by actuating switch 301 to energize the spray gun motor 179.

To move the table 65 into the metallizing or full line position shown in Fig. 3, valve 306 connected to cylinder 53 is opened which causes the cylinder to move the table 65 about shaft 48 (Fig. 17) by means of rack 52 and gear 51. As the table 65 is rotated to metallizing position about the shaft 48, the notch 88 in the template 86 moves into alignment with the roller 165 so as to enable the roller to slide through the notch to bear on the inside surface of the template.

Upon moving the table into metallizing position, manual switch 308 is closed which withdraws the template detent 68 from the bar 67 carried by the table (Figs. 6 and 21) to unlock it and enable the table to rotate about the shaft 61 (Fig. 5). At this time manual switches 304 and 319 are closed to swing the preheaters 198 in heating position as shown in Fig. 6 with respect to the marginal edge portions of the sheets by means of actuating cylinder 242, rack 241, gear 240 and arms 225 and 199.

When arm 225 is swung into heating position, roller 229 contacts the outer face 90 of template 87. At the same time, followers or rollers 206 on preheaters 198 are also brought into contact with the face 90 of the template 87. Also cables 237 and 238 carried in part by the arm 225 are moved into contact with the pulleys 236 to aid, along with the counterweight 239, in bringing the preheater rollers 206 into contact with the face of the template.

At this point manual switch 339 is closed to energize drive motor 108 which rotates table 65 in a clockwise direction as viewed in Fig. 3. Movement of the table 65 about the shaft 61 closes cycling switch 84 to limit the movement of table 65 to two complete revolutions, as described above. As the table starts to rotate, switch 365 is closed and cam 78 closes switch 83, momentarily opening pneumatic valve 273 to admit air to the cylinder 182 (Fig. 5) connected to the metallizing gun assembly 176 causing it to raise the gun to operative position as shown in Fig. 5. Table 65 continues to rotate until the point where the coating of the margin of the sheet was begun approaches the preheaters 198 at which time cam 81 momentarily closes switch 85. This energizes the cylinder 242 (Fig. 6) to cause the rack 241 to move the preheaters 198 into inoperative position away from the edge of the glass.

The table continues to rotate until the portion it is desired to metallize is completely coated. When the metallizing has been completed, the cam 79 (Fig. 6) momentarily closes the switch 82 to cause the plunger of cylinder 182 (Fig. 5) to lower the gun assembly 176 to inoperative position. At the completion of one complete revolution, cam 80 opens the switch 84 but is ineffective and the table continues for another revolution and a second reopening of switch 84 to stop further rotation of the table by motor 108 as disclosed above.

As the table 65 comes to rest, the template notch 88 in template 87 aligns with the follower roller 165 which is positioned to bear against the inside of the template. Since the notch 88 and roller 165 are now aligned, the table 65 may be pivoted away from the metallizing station on arm 59 by means of air cylinder 53 and rack 52.

It is to be understood that the forms of the invention disclosed herein are to be taken as the preferred embodiments thereof, and that various changes in the shape, size and arrangement of parts may be resorted to without departing from the spirit of the invention or the scope of the following claims.

We claim:

1. Apparatus for metallizing the marginal portions of non-rectangular sheets, means for supporting a sheet for rotation, metallizing means spaced from the sheet supporting means for applying a metal spray to marginal portions of the sheet, heating means for heating the marginal edge portions to be metallized prior to metallizing, and means for cyclically initiating and terminating said heating and metallizing means to prevent overlap of the heating and metallizing means on the applied metal.

2. In apparatus for metallizing the marginal portions of sheets having edge portions of differing contours, metallizing means for applying a metal spray coating to marginal edge portions of a sheet, means for supporting a sheet for rotation past said metallizing means to enable said metal spray from said metallizing means to be deposited on marginal edge portions of the sheet, means for rotating said sheet supporting means and sheet past said metallizing means, means for heating the marginal edge portions of the sheet in advance of the metallizing means, and means for maintaining said heating means in alignment with said marginal edge portions of the sheet, wherein means are provided for swinging the heating means into and out of heating position after a sheet has been placed in metallizing position with respect to the metallizing means.

3. In apparatus for metallizing the marginal portions of the sheets having edge portions of differing contours, metallizing means for applying a metal spray coating to marginal edge portions of a sheet, means for supporting a sheet for rotation past said metallizing means to enable said metal spray from said metallizing means to be deposited on marginal edge portions of the sheet, a template carried by the sheet supporting means having a contour corresponding to the contour of the sheet, means for rotating said sheet supporting means and sheet past said metallizing means, means for heating the marginal edge portions of the sheet in advance of the metallizing means, means for maintaining said heating means in alignment with said marginal edge portions of the sheet, and a differential speed reducer responsive to the contoured edge portion of said template operably connected to said means for driving said sheet supporting means for causing a marginal edge portion of any contour of said sheet to move past said metallizing means at a relatively constant linear rate of speed.

4. Apparatus for metallizing the marginal portions of sheets as claimed in claim 3, wherein there is provided a template operably connected to the sheet supporting means, and means are provided to contact the template when the sheet supporting means is in metallizing position to communicate changes in template curvature to said metallizing means to cause said metallizing means to be moved so as to direct the metal spray in a direction substantially normal to the edge of the sheet at all times.

5. In apparatus for metallizing the marginal portions of sheets having edge portions of differing contours, metallizing means for applying a metal spray coating to marginal edge portions of a sheet, means for supporting a sheet for rotation past said metallizing means to enable said metal spray from said metallizing means to be deposited on marginal edge portions of the sheet, means for rotating said sheet supporting means and sheet past said metallizing means, means for heating the marginal edge portions of the sheet in advance of the metallizing means, and means for maintaining said heating means in alignment with said marginal edge portions of the sheet, wherein said metallizing means is pivotally mounted for movement in an arcuate path to maintain the direction of said metal spray in a constant angular relationship with respect to the edge of said sheet.

6. In apparatus for metallizing the marginal portions of sheets having edge portions of differing contours, metallizing means for applying a metal spray coating to marginal edge portions of a sheet, means for supporting a sheet for rotation past said metallizing means to enable said metal spray from said metallizing means to be deposited on marginal edge portions of the sheet, a template carried by the sheet supporting means having a contour corresponding to the contour of said sheet means for rotating said sheet supporting means and sheet past said metallizing means, means for heating the marginal edge portions of the sheet in advance of the metallizing means movable with respect to the said marginal edge portions, and means responsive to the contoured edge portions of said template for aligning said heating means with said marginal edge portions.

7. Apparatus for metallizing the marginal portions of sheets as claimed in claim 6, wherein means are provided for swinging the heating means into and out of heating position after a sheet has been placed in metallizing position with respect to the metallizing means.

8. Apparatus for metallizing the marginal portions of sheets as claimed in claim 6, wherein means are provided connected to said means for driving said sheet supporting means for causing a marginal edge portion of any contour of said sheet to move past said metallizing means at a relatively constant linear rate of speed.

9. Apparatus for metallizing marginal portions of sheets as claimed in claim 6, wherein said metallizing means is pivotally mounted for movement in an arcuate path to accommodate for changes in curvature of a sheet as it is moved therepast.

10. In apparatus for metallizing the marginal portions of sheets having edge portions of differing contours, metallizing means for applying a metal spray to the marginal portions of a sheet, sheet supporting means, means for rotating said sheet supporting means, said sheet supporting means being movable toward and away from the said metallizing means, a template operably connected to said sheet supporting means, and means for positively engaging said template operably connected to said means for rotating said sheet suporting means and also operably connected to said metallizing means for moving said metallizing means to accommodate changes in contour of said sheet, wherein said template has a slot therein, and said means for positively engaging said template includes follower means, a portion of which is movable through said slot to the interior of said template when said template and sheet are in initial metallizing position to positively engage said sheet support means with said means for rotating said sheet support means.

11. In apparatus for providing a metal coating on marginal edge portions of glass sheets having edge portions of differing contours, means for supporting a sheet for rotation, means for rotating said sheet supporting means and sheet carried thereby, and a metallizing spray gun for directing metal spray onto the marginal edge portions of the rotating glass sheet and outwardly therefrom so as to deposit a portion of said spray in a strip of uniform width along the outermost marginal edge of said sheet.

12. In apparatus for metallizing the marginal edge portions of glass sheets as in claim 11, wherein chute means are provided for receiving the metal spray that passes beyond the edge of the glass sheet.

References Cited in the file of this patent

UNITED STATES PATENTS

| | | |
|---|---|---|
| 2,316,959 | Hinkley et al. | Apr. 20, 1943 |
| 2,334,624 | Haven et al. | Nov. 16, 1943 |
| 2,419,951 | Kastel | May 6, 1947 |
| 2,571,065 | Schneider | Oct. 9, 1951 |